Aug. 12, 1958 E. D. BRASSEUR 2,847,587

DRIVING MECHANISM FOR HEAD OF SOUND RECORDING AND REPRODUCING APPARATUS

Filed Nov. 22, 1955 4 Sheets-Sheet 1

Aug. 12, 1958 E. D. BRASSEUR 2,847,587
DRIVING MECHANISM FOR HEAD OF SOUND RECORDING
AND REPRODUCING APPARATUS
Filed Nov. 22, 1955 4 Sheets-Sheet 4

United States Patent Office 2,847,587

Patented Aug. 12, 1958

2,847,587

DRIVING MECHANISM FOR HEAD OF SOUND RECORDING AND REPRODUCING APPARATUS

Eudore Desire Brasseur, Mont-sur-Marchienne, Belgium, assignor to Societe Anonyme de Constructions Electriques Charleroi, Brussels, Belgium, a corporation of Belgium Application November 22, 1955, Serial No. 548,522

Claims priority, application France June 30, 1955

9 Claims. (Cl. 310—19)

The present invention relates to driving mechanism for a sound recording and reproducing head for sound recording and reproducing apparatus wherein the head is oscillated betwen two fixed limits of travel.

The mechanism for moving the sound head according to the present invention is particularly applicable to sound recording and reproducing devices of the electro-magnetic type, in which the record incorporates at least a layer of magnetizable material responsive to the head so as to form a sound track on the record when the device is recording and to play back the sound from the sound track when the device is reproducing. Such sound track is of a zigzag shape, with parallel main runs of the sound track extending generally transverse to the length of the record and spaced from each other, such runs being connected at their ends by short portions extending parallel to the length of the record, the main transverse portions of the sound track being formed by the head during the periods of rest of the record, and the other shorter portions thereof being formed during movement of the record.

In sound recording and reproducing device of this type it is necessary to have a uniform speed of movement of the head if the device is to yield a high quality of recording and reproduction. In most prior devices of this type, including that shown in U. S. patent application No. 529,608 filed Aug. 22, 1955, the driving mechanism for the sound recording and reproducing head includes a mechanical linkage connecting it to the prime mover. Such mechanism sometimes operates in a faulty manner due to friction in its parts, as well as being inaccurate due to lost motion between such parts. The present invention provides a head driving mechanism of simple construction having a small number of parts, the driving element being rigidly connected to the arm carrying the head. Accordingly, there is no possibility of lost motion in such mechanism, and the friction between the parts is at a minimum.

The mechanism for driving the sound recording and reproducing head of the present invention includes a substantially liquid-filled closed chamber having two opposite parallel walls, there being a shaft on which the head is mounted, such shaft having a portion mounted for oscillation in the chamber perpendicular to said parallel walls thereof. Within the chamber the shaft is provided a partition-like lever arm which oscillates with the shaft within the chamber, said lever arm functioning to displace liquid from one thus-formed compartment in the chamber to the other, thereby allowing the speed of oscillation of the shaft to be suitably regulated and substantially uniform. A pole piece is provided on the lever arm outwardly of the shaft, and magnetic means cooperates with the pole piece so as alternately to attract the pole piece in one direction and then the other to oscillate the shaft.

Among the objects of the invention is the provision of improved simplified mechanism for driving the head of sound recording and reproducing mechanism. A further object of the invention resides in the provision of such driving mechanism, whereby the sound recording and reproducing head carrying a shaft is precisely controlled in the uniformity of speed of its oscillation. Still further objects of invention lie in the provision of mechanism for driving the sound recording and reproducing head of sound recording and reproducing apparatus wherein only a small number of parts, rigidly connected to each other, are employed in the moving portion of the driving mechanism, so that lost motion between such removable part of the time mover and the head is eliminated and friction between the parts is minimized, and the improvement of mechanism for driving a sound recording and reproducing head generally.

The above and further objects of the invention relating to economies of use and manufacture will more fully appear upon consideration of the following specification and drawings forming a part of the specification. In the drawings.

Figure 1:
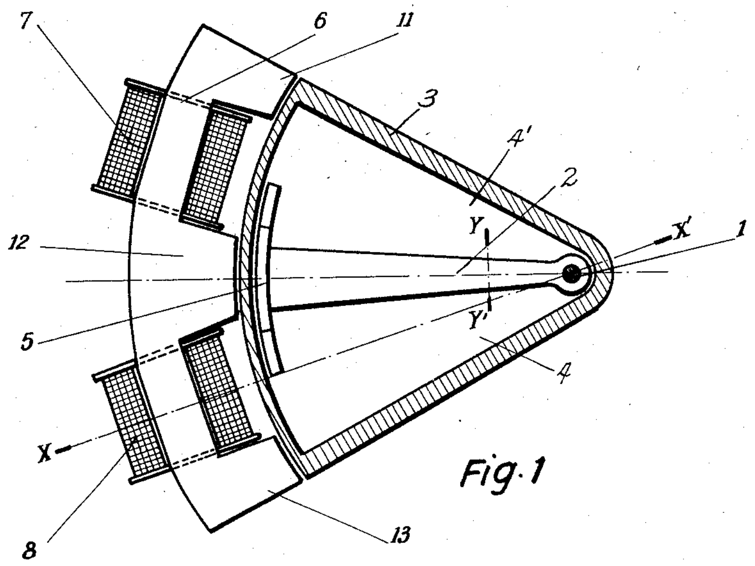
Figure 1 is a somewhat fragmentary horizontal section through a first embodiment of the sound recording and reproducing head driving mechanism of the invention.
Figure 2:
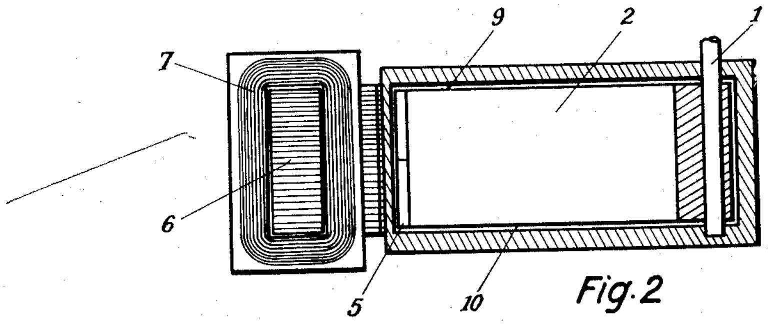
Figure 2 is a vertical section through such mechanism, the section being taken generally along the line X—X' of Fig. 1.
Figure 3:
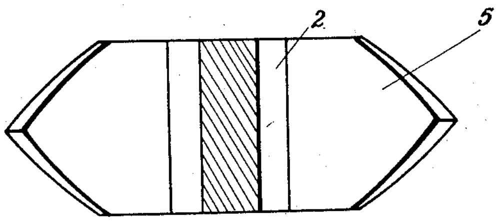
Figure 3 is a view in vertical section through the lever arm on the shaft carrying the sound head, the section being along the Y—Y' of Fig. 1, the figure showing in detail the pole piece or blade mounted on the free end of the lever arm.

In the driving mechanism shown in Figures 1, 2 and 3, the sound recording and reproducing head, not shown, is mounted on the outer end of an arm, also not shown, affixed generally transversely to an oscillating shaft 1. The shaft 1 has its lower end positioned within the sector-shaped chamber 3, substantially at the apex of the latter, and perpendicular to the upper and lower parallel walls of the chamber. Affixed to the portion of the shaft 1 within the chamber is the partition-like lever arm 2, which carries on its outer free end the pole piece or blade 5, which lies close and parallel to the inner surface of the outer curved wall of the chamber. The lever arm 2 and the wall of the chamber 3 are made of non-magnetic material, the pole piece or blade 5 being made of magnetic material.

Positioned outwardly of and closely adjacent to the curved wall of the chamber is a correspondingly curved magnet device having a core 6 with a central pole 12 and two side poles 11 and 13 thereon. A first solenoid coil 7 is disposed on the core between poles 11 and 12, and a second solenoid or magnet coil 8 is disposed on the core between the poles 12 and 13. The coils 7 and 8 are alternately energized and de-energized, as by switch means (not shown) operated in timed relationship to the oscillation of the shaft 1. When the coil 7 is energized and the coil 8 is de-energized, the pole piece 5 tends to swing, carrying with it the lever arm 2, so as to bridge the space between the poles 11 and 12. When the coil 8 is energized and the coil 7 is de-energized, the pole piece 5 swings to bridge the space between the poles 12 and 13. Preferably the blade or pole piece 5 is symmetrical on each side of the lever arm 2, as shown in Fig. 3, and is also symmetrical vertically of a central horizontal transverse plane therethrough. Blade 5 preferably is provided at its opposite ends with central points 5', so as to improve the magnetic characteristics of the magnetic circuit composed of the poles 11, 12 and 13 and the blade 5.

The lever arm 2 and the blade 5 are so positioned in the chamber 3 as substantially to divide it into 2 compartments 4 and 4'. The chamber 3 is substantially filled at all times with a liquid such as silicone oil. As the lever arm 2 and blades 5 oscillate from one terminal position to the other, the liquid in the compartments 4 and 4' is alternately subjected to compression and decompression. In the apparatus shown in Figs. 1, 2 and 3, the liquid flows from 1 compartment to the other by way of the clearance spaces 9 and 10 above and below the lever arm 2 and the clearance space between the blade 5 and the confronting curved surface of the chamber. Such flow of liquid through confined paths of flow subjects the speed of oscillation of lever arm 2 to very close control whereby it oscillates at a constantly uniform selected speed. It will be understood that, by way of variation of the structure shown, the flow of the liquid from one compartment to the other may be by way of an exterior passage, which may be provided with a throttling valve, rather than by passages interiorly of the chamber. Further, the speed of oscillation of the lever arm 2 may also be controlled by variation of the energizing voltage imposed upon the coils 7 and 8, as is indicated in the wiring diagram of Fig. 9 for the device of Figs. 6, 7 and 8, to be described. It is also obvious that the pole piece or blade 5 can be made as a permanent magnet, in which case one centrally positioned reversely energized electromagnet may be employed to corporate therewith, whereby the direction of travel of the lever arm 2 is alternately reversed.

Figure 4:
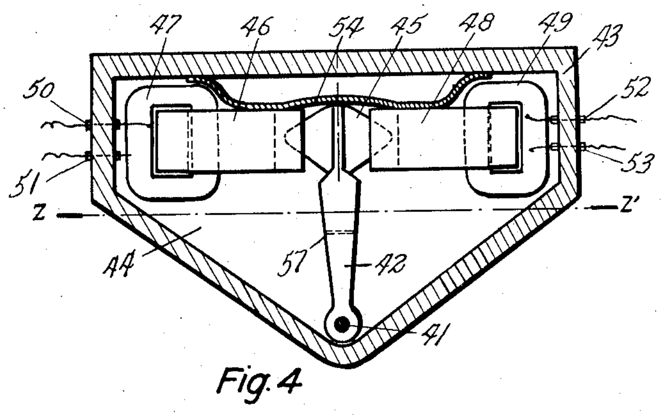
Figure 4 is a fragmentary view in horizontal section through a second embodiment of sound head driving mechanism in accordance with the invention.
Figure 5:
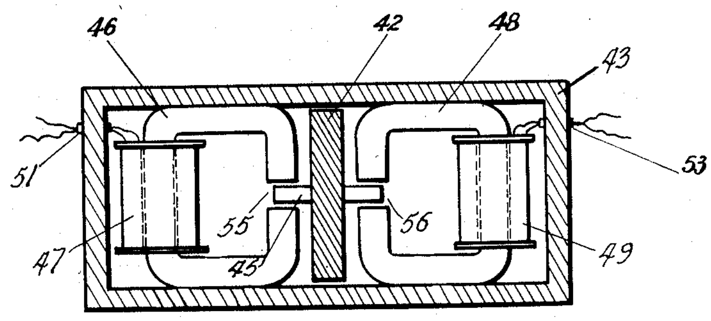
Figure 5 is a vertical section through the mechanism of Figure 4, the section being taken generally along the line Z—Z' of Figure 4.

With the second disclosed embodiment of the driving mechanism of the invention, shown in Figs. 4 and 5, somewhat improved efficiency of the magnetic field is obtained. In this mechanism, the electro-magnets are disposed within the liquid-tight chamber containing the oscillating lever arm, and the magnets act symmetrically, both vertically and longitudinally thereof, upon the movable pole piece or blades.

In the driving mechanism of Figs. 4 and 5, shaft 41, carrying a sound and reproducing recording head, not shown, extends through parallel upper and lower walls of the chamber 43 perpendicular thereto. A shaft 41 is located substantially at apex of the lower, pointed portion of the chamber in Fig. 4. Attached to shaft 41 is a partition-like lever arm 42, which oscillates in both directions from the central position thereof shown in Fig. 4. Symmetrically positioned in the squared end of chamber 43 are the opposed C-shaped magnetic cores 46 and 48, which have magnet or solenoid coils 47 and 49, respectively, mounted thereon as shown.

Symmetrically attached to the outer free end of the lever arm 42 is the horizontally disposed, generally diamond-shaped, magnetic pole piece or blade 45, the ends of which extend between the confronting poles at the gaps 55 and 56 of the cores 46 and 48, respectively. The lever arm 42 is made of such vertical dimension as to fit fairly accurately between the inner surfaces of the upper and lower parallel walls of the chamber. Positioned within the chamber and cooperating with the outer free end of the lever arm 42 is a thin sheet member having a central curved zone 54 which approximately sealingly cooperates with the outer end of the lever arm. The chamber 43 is filled with a liquid 44, so that as the lever arm 42 moves to one side it places the liquid in the compartments which it approaches to compression, and subjects the other compartments to decompression. Escape of liquid from one compartment to the other, in this instance, takes place mainly by way of the small opening 57 extending through the lever arm 42.

It will be understood that the magnet coils 47 and 49 are alternately energized and de-energized by subjecting the wire leads 50, 51 and 52, 53 thereof alternately to energizing current. With the mechanism of Figs. 4 and 5, the dispersion flux is negligible, and thus the efficiency of the device is high. Further, the magnetic attraction exerted upon the blade 45 and the respective magnets is substantially symmetrical, thereby reducing to a minimum torsional or frictional forces exerted upon the bearings mounting the shaft 41.

Figure 8:
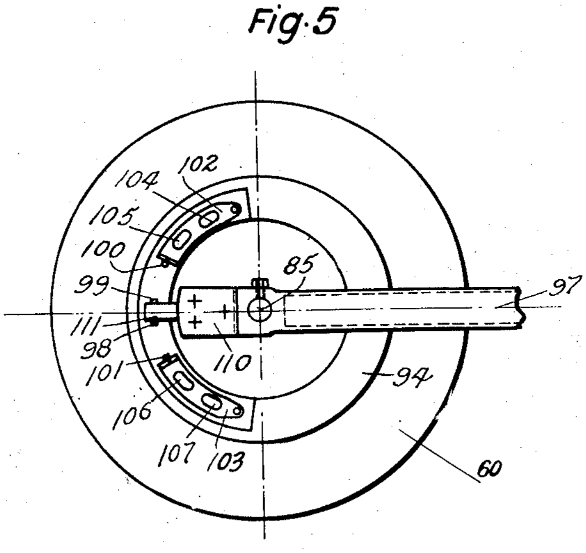
Figure 8 is a plan of the apparatus shown in Figures 6 and 7.
Figure 6:
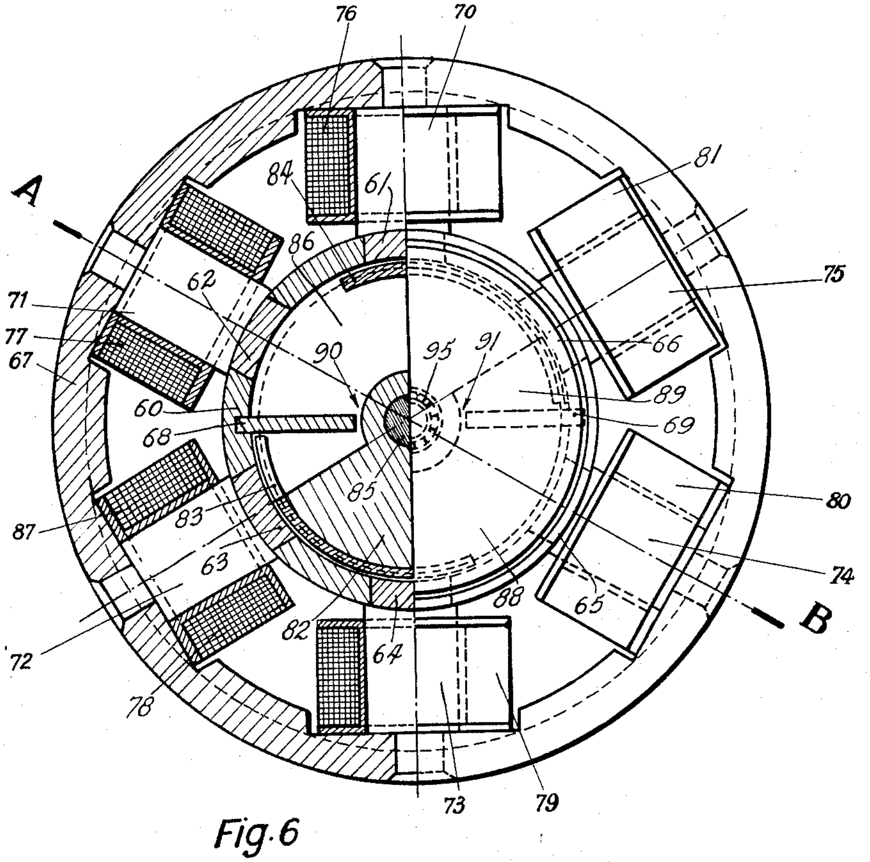
Figure 6 is a fragmentary view, half in plan and half in horizontal section, of a third embodiment of mechanism in accordance with the invention for driving a sound recording and reproducing head.
Figure 7:
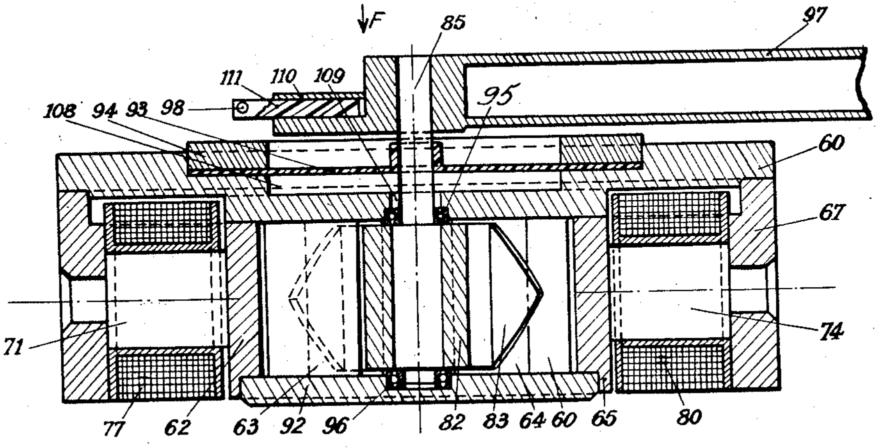
Figure 7 is a view in vertical section through the mechanism of Figure 6, the section being taken generally along the line A—B of Figure 6.

The head driving mechanism of Figs. 6, 7 and 8 is particularly characterized by its smoothness of operation, and by the nicety of control of the speed so that the oscillation can take place at a selected speed uniformly throughout the oscillation and extent of oscillation of the sound reproducing and recording head.

In the mechanism of Figs. 6, 7 and 8, there are provided a circular cylindrical tank 60 made of non-magnetic material and having parallel upper ends and lower walls. Positioned co-axial of the tank, and perpendicular to the upper and lower end walls thereof, is an oscillating shaft 85 bearing an arm 97 on the end of which is supported the sound recording and reproducing head (not shown). Ball bearings 95 and 96 support the shaft 85 in the end walls of the tank. Six electric magnets are uniformly distributed around the outer curved walls of the tank, the cores 70, 71, 72, 73, 74, and 75 of such magnets being made of iron or soft steel and riveted to a generally circular exterior structure 67 of magnetic material which encircles the tank. Around the cores are placed, respectively, magnet coils 76, 77, 78, 79, 80, and 81.

In order to reduce to a minimum the air gaps between the magent poles and the movable pole piece within the tank 60, the parts of the wall of the tank, designated respectively 61, 62, 63, 64, 65 and 66, which are opposite the cores of the electro-magnets are inserts composed of magnetic material. Preferably the inner face of each insert is very carefully finished to lie accurately flush with the main extent of the inner curved wall of the tank 60.

Attached to the shaft 85 interiorly of the tank is the two-armed partition-like member 82, the side surfaces of which lie radially of the shaft. On the outer end of each of the arms of member 82 is a blade or pole piece of magnetic material, designated 83 and 84, respectively. Blades 83 and 84 are curved so as to fit accurately and closely within the curved wall of the tank, and preferably have their opposite ends pointed as indicated in Fig. 7. Two oppositely disposed fixed separator partitions 68 and 69 are disposed in the tank 60 between the opposite arms of the member 82, the inner ends of the separators extending close to the curved central hub of the member 82 as shown. The separators 68 and 69 and the two arms of the member 82 form four sub-compartments 86, 87, 88 and 89 within the tank 60.

The tank 60 is filled with a liquid, for example, silicone oil. When the two-armed member 82 is oscillated, by means to be described hereinafter, the liquid in chambers 86, 87, as one set, and 88, 89, as another set, is by turns placed in a state of compression and decompression. Clearance spaces 90 and 91, between the inner ends of separators 68 and 69 and the hub of member 82, allow the thus described flow of liquid from one subcompartment to another.

The tank 60 is provided with a compensating reservoir containing liquid in communication with that within the tank proper, whereby the tank is always maintained filled with liquid. The reservoir is formed by the groove 108 in the upper member forming the top of the tank. The top of reservoir is formed by an elastic diaphragm member 93, made of material such as synthetic rubber, which has its edges sealed in the edge of groove 108 by an annular clamp member 94. An inner hub member on the diaphragm 93 is sealed to the shaft 85. Communication between the reservoir and the main cavity in tank 60 is provided through the annular passage 109 and through the upper ball bearing 95, which with the bottom ball bearing 96, supports shaft 85. The main horizontal extent of the diaphragm 93 is of very substantial area, and thus maintains atmospheric pressure upon the liquid in the cavity in the tank and in the reservoir when they are filled with liquid. The diaphragm 93 is of such relatively small thickness as not to impose more than a slight restraint on the oscillation of the shaft 85.

Figure 9:
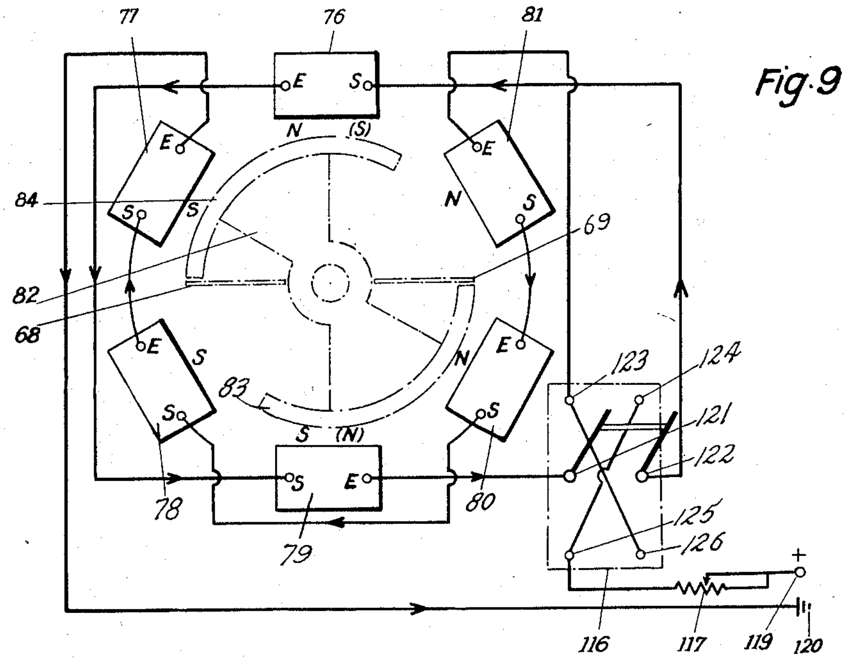
Figure 9 is a wiring diagram for the head-driving mechanism of Figures 6, 7 and 8.

The manner in which the electro-magnets of the device cooperate with the blades of pole pieces 83 and 84 on the member 82 will be apparent from consideration of the wiring diagram shown in Fig. 9. The two diametrically opposed magnets 76 and 79 are positioned symmetrically on the mid-plane of oscillation of the member 82. The coils of magnet 76 and 79 are connected in series as shown, terminal *s* of magnet 79 being connected to terminal *e* of magnet 76, and the coils are so disposed that when energized as shown from the center terminals 121, 122 of a reversing switch 116 the polarity of magnet 76 is always opposite that of magnet 79, but the polarities of said magnets 76 and 79 may be simultaneously reversed by means of the switch 116.

The remaining electro-magnets, 77 and 78, and 80 and 81, are angularly spaced concentrically around the shaft 85 between the magnets 76 and 79, magnets 77 and 78, and 80 and 81, being positioned at the same angle to the mid-plane of oscillation of member 82. Preferably, as shown, all of magnets 76–81, inclusive, are uniformly angularly spaced around shaft 85. The terminals *e* and *s* of magnets 77 and 78, 80 and 81 are so connected that the windings of the magnets are in series, the polarity of the set of magnets 77, 78 always being the same, for example south as indicated in Fig. 9, and the polarity of magnets 80 and 81 always being the same, north as shown in Fig. 9, and opposite from the polarity of the magnets 77, 78. The coils of magnets 77 and 78, 80 and 81 are energized through the reversing switch 116, but they are so connected thereto that the polarity of their energizing circuit remains the same even though the polarities of magnets 76 and 79 are reversed. Specifically, the terminal 125 of the reversing switch 116 is connected to the positive terminal 119 of a source of electric current through the rheostat 117, whereby the speed of oscillation of the member 82 may be appreciably varied as desired. When the movable contactor of switch 116 is placed in an upper, circuit-closing position (Fig. 9) the circuit is closed between the contacts 124 and 122 of switch 116, the current then running in the direction of the arrows to energize the magnets 76 and 79. In such position of the movable contactor of switch 116, the contact 121 is connected to the contact 123 thereof. As a result, the windings of magnets 77 and 78, 80 and 81 is energized by current running in the direction of the arrows shown in Fig. 9. When the movable contactor of switch 116 is thrown into the bottom, circuit-closing position (Fig. 9) the direction of the energizing current for magnets 76 and 79 is reversed, since contact 121 of the switch is not connected to contact 125 thereof. The polarity of energization of the other magnets, however, remains the same as formerly, since the terminal 123 of switch 116 is cross-connected to terminal 126 thereof, and terminal 124 is cross-connected to terminal 125. As shown, one terminal of the energizing circuit for the latter set of four magnets remains permanently connected to ground at 120.

The movable contactor of the reversing switch 116 may be actuated from the shaft 85, in the manner indicated in Figs. 7 and 8. As there shown, an arm 97, integral with shaft 85, supports an insulating arm 111 which carries two electrical contacts 98 and 99 on its opposite radial faces. Element 111 is secured by means of flat sheet metal member 110. Opposing contacts 100 and 101, cooperating with the contacts 99 and 98 resepectively, are carried on insulating members 102 and 103 adjustably secured to a fixed part of the structure by screws extending through elongated holes 104, 105 and 106, 107 in members 102 and 103, respectively. Appropriate adjustment of the separation of members 102 and 103 allows adjustment of the length of stroke of the sound head-carrying arm 97. The thus described timing switch device operating through an appropriate relay, not shown, may be employed to drive the record support (not shown) of the machine in timed relationship with the oscillation of the arm 97 and to reverse the position of the movable contactor of reversing switch 116 in the proper timed relation to the feeding of the record support. Such relationship between the direction of movement of the arm 97 and the record support is described in U. S. patent application No. 529,609, filed August 22, 1955.

In Fig. 9 there are indicated by letters without parenthesis the polarity of the respective magnets when the movable current contact door of switch 116 is thrown into the upper position. In such condition of the device, the magnetic blade of pole piece 84 on member 82 is attracted into the position shown in dot and dash lines in Fig. 9 so to lie between electro-magnets 76 and 77 to close magnetic circuit therebetween. Blade 83 is similarly attracted by the magnets 79 and 80. To the attractive effect upon the pole pieces exercised by magnets 76, 77 and 79, 80, there is added the effect of replusion of such pole pieces by electromagnet 81 acting upon blade 84, and electro-magnet 78 acting upon blade 83. This results from the fact that the ends of the respective pole pieces 84 and 83 nearer the respective magnets with fixed polarities have instantaneous polarities which are opposite from the polarities of the fixed magnets. When the movable contactor of switch 116 is reversed and thrown into the lower position, magnet 76 then has a south polarity, and the blade 84 is attracted to lie between it and magnet 81, the magnet 77 then exercising a replusive effect upon the blade 84. Correspondingly, the blade 83 then moves to lie between the magnet 78 and the then north magnet 79, and is repelled by the magnet 80.

Figure 10:
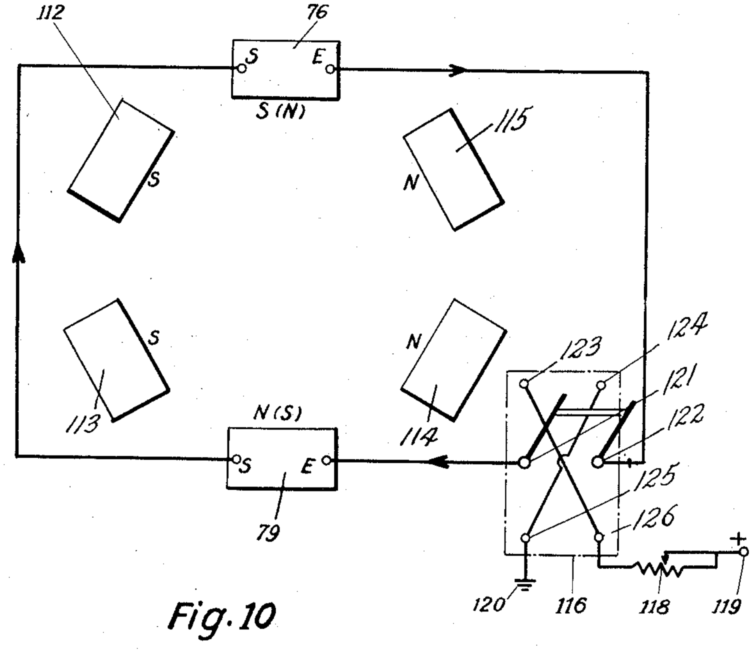
Figure 10 is a wiring diagram of a further embodiment of the driving mechanism, such driving mechanism being a modification of that of Figures 6, 7 and 8.

In Fig. 10 there is shown a simplified circuit for the sound head driving mechanism of Figs. 6, 7 and 8. In this embodiment of the invention, the relationship of the electro-magnet 76 and 79 to each other and the manner of energizing them from the reversing switch 116 remains the same as in Fig. 9. Contact 125 of the reversing switch is in this instance connected to ground 120 and contact 126 is connected to positive current source 119 through rheostat 118. The magnets of fixed polarity 77, 78, 80 and 81 of Fig. 9 are in Fig. 10 replaced by fixed permanent magnets 112, 113, 114 and 115, respectively.

While presently preferred embodiments of the apparatus of the invention have been shown by way of example in the drawing and particularly described, it will be understood that the invention is in no way limited to such illustrative embodiments.

What I claim and desire to secure by Letters Patent is:

1. In sound recording and reproducing apparatus wherein a sound recording and reproducing head is oscillated between two fixed limits, an improved mechanism for driving said head comprising a closed chamber having two opposite parallel walls, said chamber being symmetrical about a plane perpendicular to said walls, said chamber being substantially filled with liquid, a head-driving shaft having a portion mounted for oscillation in the chamber perpendicular to said walls, a partition-like lever arm mounted on the shaft in a plane substantially normal to said walls and for oscillation with the shaft within the chamber thereby dividing said chamber into two compartments, said lever being adapted to alternately displace liquid at an equal rate of displacement from one thus-formed compartment in the chamber to the other when oscillated, a laterally symmetrical pole piece mounted on the outer end of the lever, and at least two alternately energized electro-magnets, one located on each side of the plane of symmetry, alternately to attract the pole piece in one direction and then the other to oscillate the shaft, and said pole piece being provided with means whereby it is attracted at a substantially uniform rate of attraction by said electro-magnets.

2. Mechanism for driving a sound recording and reproducing head according to claim 1, in which the pole piece has oppositely directed pointed ends symmetrical with respect to a central plane corresponding to a plane in which the shaft lies.

3. In sound recording and reproducing apparatus wherein a sound recording and reproducing head is oscillated between two fixed limits, an improved mechanism for driving said head comprising a substantially closed cylindrical tank defining a chamber having two opposite parallel end walls, said tank being substantially filled with liquid, a head-driving shaft having a portion mounted for oscillation centrally in the chamber perpendicular to said walls, two fixed opposed radial separators positioned between the parallel walls of the tank, two radially opposed partition-like lever arms mounted on the shaft for oscillation therewith within the chamber, said lever arms disposed for forming with respective separators two pairs of sub-compartments of alternately increasing and decreasing volume, means defining narrow liquid passageways between said pairs of sub-compartments, said lever arms functioning to alternately displace at substantially equal rates of transfer thereof the liquid through the narrow passageways from two thus-formed sub-compartments in the chamber to the other two sub-compartments therein when oscillated, a laterally symmertical profiled pole piece mounted on each outer-end of said two-ended partion-like lever, and magnetic means cooperating with each pole-piece to attract said pole-piece at substantially uniform rates of attraction in one direction and then the other to oscillate the shaft at uniform and equal speeds in both directions of oscillation.

4. Mechanism for driving a sound recording and reproducing head according to claim 3, in which the magnetic means comprise two sets of two electro-magnets of opposite polarity disposed circumferentially in quadrature, the first set being situated in a plane perpendicular to the separator vanes and the second set situated in the plane of the separator vanes, and including means to energize at the same time both sets of electro-magnets, and means to reverse simultaneously the polarity of both electro-magnets of the first set at the end of every oscillation of the shaft, said laterally symmetrical pole pieces mounted on each outer-end of said double ended partition-like lever extending circumferentially at least between two adjacent magnets, whereby each pole piece is attracted by two adjacent magnets of opposite polarities when the polarity of the first set of electro-magnets is reversed.

5. Mechanism for driving a sound recording and reproducing head according to claim 4, in which the second set of electro-magnets comprises four electro-magnets disposed symmetrically on each side of a plane perpendicular to the separator vanes, means to energize said electro-magnets and connected to make the polarity of the two electro-magnets disposed on one side of said plane the same but opposite to the polarity of the other two disposed on the other side of said plane thereby to produce an attraction of the pole pieces in one direction of oscillation and a simultaneous repelling effect acting in the same direction of oscillation.

6. In sound recording and reproducing apparatus wherein a sound recording and reproducing head is oscillated between two fixed limits, an improved mechanism for driving said head comprising a substantially liquid filled closed chamber having two opposite parallel walls and an end wall, a head-driving shaft having a partition-like lever arm mounted for oscillation therewith within the chamber and mounted substantially normal to said parallel walls dividing said chamber into two compartments, means defining a narrow liquid passageway of predetermined dimensions between said two compartments, said lever functioning to alternately displace the liquid through the narrow passageway from one thus-formed compartment in said chamber to the other when oscillated, a profiled pole piece mounted on the lever outwardly of the shaft and spaced a selected distance from said end wall, and magnetic means alternately to attract the pole piece at substantially uniform rates of attraction in one direction and then the other to oscillate the shaft at substantially uniform and equal speeds in both directions of oscillation, said narrow passageway defining means comprising said end wall and a surface of said pole piece disposed opposite from said end wall.

7. In sound recording and reproducing apparatus wherein a sound recording and reproducing head is oscillated between two fixed limits, an improved mechanism for driving said head comprising a substantially liquid filled closed chamber having two opposite parallel walls, a head-driving shaft having a partition-like lever arm mounted for oscillation therewith within the chamber and mounted substantially normal to said parallel walls dividing said chamber into two compartments, said lever being provided with a transverse opening comprising a liquid passageway of a selected narrow dimension and functioning to alternately displace at substantially equal rates of transfer the liquid through the narrow passageway from one thus-formed compartment in said chamber to the other when oscillated, a profiled pole piece on the lever outwardly of the shaft, and magnetic means alternately to attract the pole piece at substantially uniform rates of attraction in one direction and then the other to oscillate the shaft at substantially uniform and equal speeds in both directions of oscillation.

8. Mechanism for driving a sound recording and reproducing head according to claim 5, in which said electro-magnets comprise cores, and in which the cylindrical tank walls opposite the circumferentially disposed electro-magnets are provided with inserts of a magnetic material, said inserts being disposed opposite said cores and having their inner faces substantially flush with the inner arcuate wall surfaces of the cylindrical tank defining said chamber.

9. In sound recording and reproducing apparatus wherein a sound recording and reproducing head is oscillated between two fixed limits, an improved mechanism for driving said head comprising a closed cylindrical tank defining a chamber having two opposite parallel end walls, said tank being substantially filled with liquid, a head-driving shaft having a portion mounted for oscillation centrally in the chamber perpendicular to said walls, two fixed opposed radial separators positioned between the parallel walls of the tank, two radially opposed partition-like lever arms mounted on the shaft for oscillation therewith within the chamber, said lever arms disposed forming with respective separators two pairs of sub-compartments of alternately increasing and decreasing volume, means defining narrow liquid passageways between said pairs of sub-compartments, said lever arms functioning to alternately displace at substantially equal rates of transfer thereof the liquid through the narrow passageways from two thus-formed sub-compartments in the chamber to the other two sub-compartments therein when oscillated, a laterally symmetrical pole piece mounted on each outer-end of said two-ended partition-like lever, magnetic means cooperating with each pole-piece to attract said pole-piece at a substantially uniform rate of attraction in one direction and then the other to oscillate the shaft at substantially uniform and equal speeds in both directions of oscillation, and means cooperating with said cylindrical tank defining a liquid-filled compensating reservoir containing liquid in communication with the liquid in said tank, said compensating chamber having a wall portion of relatively large area comprising a pressure-responsive diaphragm responsive to atmospheric pressure, whereby the first mentioned chamber is constantly maintained filled with liquid.

References Cited in the file of this patent

UNITED STATES PATENTS

| | | |
|---|---|---|
| 851,976 | Benecke | Apr. 30, 1907 |
| 1,006,090 | Hoge | Oct. 17, 1911 |
| 1,160,243 | Bell | Nov. 16, 1915 |
| 1,269,519 | Benecke | June 11, 1918 |
| 1,301,949 | Kendall | Apr. 29, 1919 |
| 1,802,150 | Johnson | Apr. 21, 1931 |
| 1,841,166 | Wanner | Jan. 12, 1932 |
| 2,457,868 | Chiesa | Jan. 4, 1949 |

UNITED STATES PATENT OFFICE

CERTIFICATE OF CORRECTION

Patent No. 2,847,587 August 12, 1958

Eudore Desire Brasseur

It is hereby certified that error appears in the above numbered patent requiring correction and that the said Letters Patent should read as corrected below.

In the grant, lines 2 to 4, for "assignor to Societe Anonyme de Constructions Electriques Charleroi, of Brussels, Belgium, a corporation of Belgium," read -- assignor to Societe Anonyme dite Ateliers de Constructions Electriques Charleroi, of Brussels, Belgium, a corporation of Belgium, --; lines 13 and 14, for "Societe Anonyme de Constructions Electriques Charleroi, its successors" read -- Societe Anonyme dite Ateliers de Constructions Electriques Charleroi, its successors --; in the heading to the printed specification, lines 5 to 7, for "assignor to Societe Anonyme de Constructions Electriques Charleroi, Brussels, Belgium, a corporation of Belgium" read -- assignor to Societe Anonyme dite Ateliers de Constructions Electriques Charleroi, Brussels, Belgium, a corporation of Belgium. --.

Signed and sealed this 14th day of April 1959.

(SEAL)
Attest:
KARL H. AXLINE
Attesting Officer

ROBERT C. WATSON
Commissioner of Patents